United States Patent
Brack

[11] 4,220,780
[45] Sep. 2, 1980

[54] CATIONIC DYESTUFFS

[75] Inventor: Alfred Brack, Odenthal, Fed. Rep. of Germany

[73] Assignee: Bayer Atkiengesellschaft, Leverkusen, Fed. Rep. of Germany

[21] Appl. No.: 904,444

[22] Filed: May 9, 1978

[30] Foreign Application Priority Data

May 11, 1977 [DE] Fed. Rep. of Germany ....... 2721190

[51] Int. Cl.² ............ C07D 417/04; D06P 1/38
[52] U.S. Cl. .................. 546/167; 544/101; 544/128; 544/345; 544/363; 546/81; 546/84; 546/88
[58] Field of Search ............ 546/167, 171

Primary Examiner—Donald G. Daus
Assistant Examiner—L. Jones

[57] ABSTRACT

Cationic dyestuffs of the formula

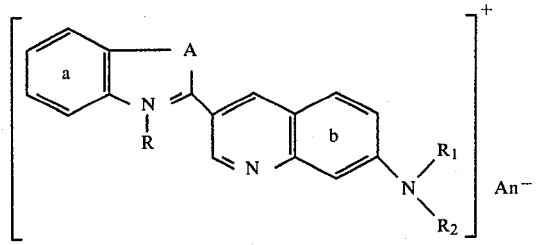

wherein
A represents oxygen, sulphur or the groupings $>N-R_3$,

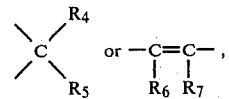

wherein
$R_3$ denotes an alkyl, aryl or aralkyl radical,
$R_4$ and $R_5$ independently of one another denote an alkyl radical,
$R_6$ and $R_7$ independently of one another denote hydrogen or an alkyl radical,
R represents hydrogen or an alkyl group,
$R_1$ and $R_2$ independently of one another represent hydrogen or an alkyl, aryl or aralkyl radical, or
$R_1$ can be bonded to $R_2$ or to the ring b, and
An⁻ represents an anion, and wherein
the rings a and b and the radicals R, $R_1$, $R_2$ and $R_3$ can contain non-ionic substituents which are customary in dyestuff chemistry or carboxyl groups, are suitable for dyeing synthetic and natural materials, in particular paper.

6 Claims, No Drawings

CATIONIC DYESTUFFS

The present invention relates to cationic dyestuffs of the formula

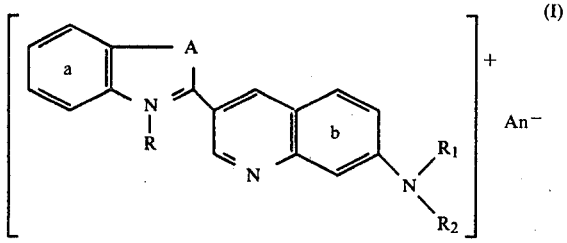

wherein

A represents oxygen, sulphur or the groupings >N—R₃,

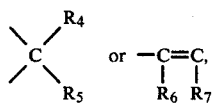

wherein

R₃ denotes an alkyl, aryl or aralkyl radical,

R₄ and R₅ independently of one another denote an alkyl radical,

R₆ and R₇ independently of one another denote hydrogen or an alkyl radical,

R represents hydrogen or an alkyl group,

R₁ and R₂ independently of one another represent hydrogen or an alkyl, aryl or aralkyl radical, or R₁ can be bonded to R₂ or to the ring b, and An⁻ represents an anion, and wherein
the rings a and b and the radicals R, R₁, R₂ and R₃ can contain non-ionic substituents which are customary in dyestuff chemistry or carboxyl groups, and processes for the preparation of these dyestuffs and their use for dyeing synthetic, partially synthetic and natural materials, in particular paper.

Examples of non-ionic substituents which are customary in dyestuff chemistry are halogen atoms, nitrile, carboxylic acid ester and carboxylic acid amide groups, hydroxyl, acyloxy, alkoxy, aralkoxy, aryloxy and the analogous mercapto groups, amino groups which are optionally monosubstituted or disubstituted by alkyl, aryl, aralkyl or acyl radicals, acyl and sulphonyl radicals, sulphonic acid-aryl radicals and sulphonamido groups and, on the rings, nitro and alkyl groups.

In the scope of this invention, alkyl radicals are, in particular, those with at most 6 C atoms.

Examples of substituents of the alkyl radicals R, R₁, R₂ and R₃ are halogen, hydroxyl, C₁-C₄-alkoxy, phenyloxy, benzyloxy, C₁-C₄-alkoxycarbonyl, carboxyl, amidocarbonyl or cyano.

Aryl is preferably understood as phenyl and aralkyl is understood as benzyl and β-phenyl-C₁-C₄-alkyl. The phenyl rings can be substituted by, for example, 1-3 non-ionic radicals, such as halogen, C₁-C₄-alkyl, C₁-C₄-alkoxy, C₁-C₄-alkoxycarbonyl, amidocarbonyl, cyano, amidosulphonyl, C₁-C₃-alkylcarbonylamino or benzoylamino, or by carboxyl.

The ring a can be substituted, for example, by 1 or 2 non-ionic radicals, such as halogen, C₁-C₄-alkyl, C₁-C₄-alkoxy, benzyl, benzyloxy, C₁-C₄-alkoxycarbonyl, amidocarbonyl, carboxyl, amidosulphonyl or cyano.

Examples of preferred non-ionic radicals in the ring b are halogen, C₁-C₄-alkyl, C₁-C₄-alkoxy or carboxyl.

Halogen is understood, in particular, as fluorine, chlorine and bromine.

The radical R₁ can be bonded to R₂ or to ring b, for example, to form a 5-membered or 6-membered ring. The radicals R₁ and R₂, together with the nitrogen atom, form, for example, a pyrrolidine, piperidine, piperazine or morpholine ring, or R₁, together with the nitrogen atom and the o-position of the ring b, forms a tetrahydroquinoline, dihydroindole, tetrahydroquinoxaline or tetrahydro-1,4-benzoxazine ring.

In general, the anion is determined by the preparation process. However, it can also be replaced in any desired manner. An⁻ denotes, in particular, methosulphate and ethosulphate, chloride, bromide, (bi-)sulphate, benzene-, toluene- or methane-sulphonate, acetate or amidosulphonate.

Dyestuffs of the formula

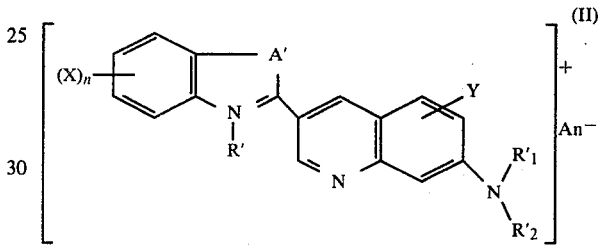

wherein

A' represents oxygen, sulphur or the groupings >N—R'₃,

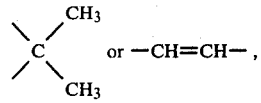

wherein

R'₃ denotes a C₁-C₄-alkyl radical, which can be substituted by halogen, hydroxyl, C₁-C₄-alkoxy, phenyloxy, benzyloxy, C₁-C₄-alkoxycarbonyl, carboxyl, amidocarbonyl or cyano, or a phenyl, benzyl or β-phenyl-C₁-C₄-alkyl radical, which can be substituted in the phenyl radical by halogen, C₁-C₄-alkyl, C₁-C₄-alkoxycarbonyl, carboxyl, amidocarbonyl, cyano, amidosulphonyl, C₁-C₃-alkylcarbonylamino or benzoylamino, R' represents hydrogen or a C₁-C₆-alkyl radical, which can be substituted by halogen, hydroxyl, C₁-C₄-alkoxy, phenyloxy, benzyloxy, C₁-C₄-alkoxycarbonyl, carboxyl, amidocarbonyl or cyano, R'₁ and R'₂ independently of one another represent hydrogen or a C₁-C₆-alkyl radical, which can be substituted by halogen, hydroxyl, C₁-C₆-alkoxy, phenyloxy, benzyloxy, C₁-C₄-alkoxycarbonyl, carboxyl, amidocarbonyl or cyano, or a phenyl, benzyl or β-phenyl-C₁-C₄-alkyl radical, which can be substituted in the phenyl radical by halogen, C₁-C₄-alkyl, C₁-C₄-alkoxy, C₁-C₄-alkoxycarbonyl, carboxyl, amidocarbonyl, cyano, amidosulphonyl, $C_1$–$C_3$-alkylcarbonylamino or benzoylamino, X represents halogen, $C_1$–$C_4$-alkyl, $C_1$–$C_4$-alkoxy, phenyloxy, benzyloxy, $C_1$–$C_4$-alkoxycarbonyl, carboxyl, amidocarbonyl, cyano, amidosulphonyl, $C_1$–$C_3$-alkylcarbonylamino or benzoylamino, Y represents hydrogen, halogen, $C_1$–$C_4$-alkyl or $C_1$–$C_4$-alkoxy, n represents 0, 1 or 2 and $An^-$ represents an anion, are to be singled out.

Dyestuffs of the formulae I and II in which A and A' respectively represent oxygen or sulphur are preferred.

Dyestuffs of the formula

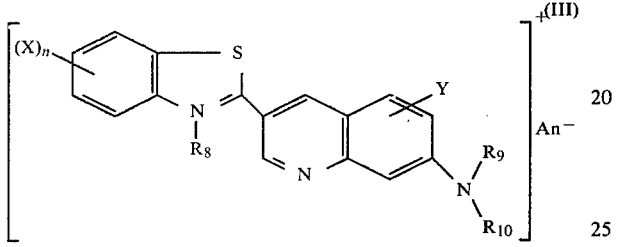

wherein $R_8$ represents a methyl, ethyl, β-hydroxyethyl, β-amidocarbonylethyl, β-cyanoethyl, β-chloroethyl or β-$C_1$–$C_4$-alkoxyethyl group, $R_9$ and $R_{10}$ represent methyl, ethyl, benzyl and β-phenylethyl and X, Y, $An^-$ and n have the meaning indicated in formula II, are particularly preferred.

The most valuable of these dyestuffs are those in which $R_8$, $R_9$ and $R_{10}$ = methyl or ethyl, Y hydrogen and n = O.

The new dyestuffs are prepared by a process in which a heterylmalonodialdehyde of the formula

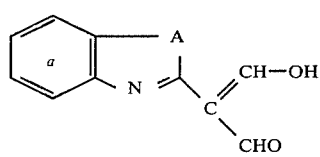

wherein

A and a have the meaning given above, is subjected to a condensation reaction with an amine of the formula

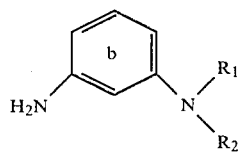

wherein $R_1$, $R_2$ and b have the meaning indicated, and wherein the benzene ring is unsubstituted in the para-position relative to the disubstituted amino group, to give a quinoline derivative of the formula

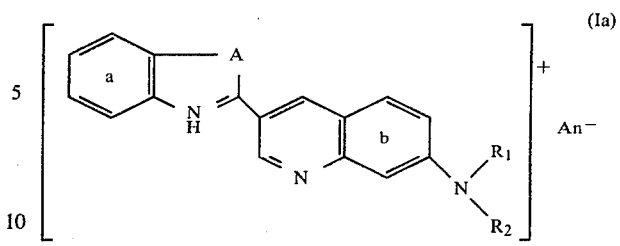

and, if desired, that is to say if R is to be different to hydrogen, this is quaternised by treatment with an acid-binding agent and an alkylating agent.

Instead of the heteryl-malonodialdehyde, it is also possible to use a suitable functionally equivalent derivative, for example an enamine of the formula

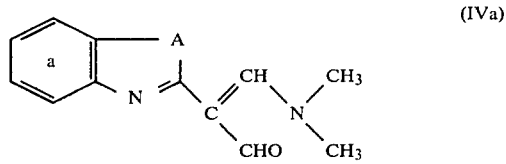

or the salt-like bis-enamines, which are primarily formed in the Vilsmeier preparation of the dialdehydes and, in the case where dimethylformamide is used as the Vilsmeier reagent, correspond to the formula

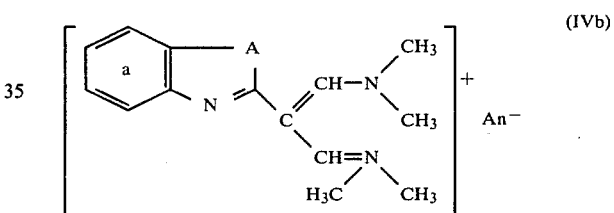

The alkali metal salts of the enolised dialdehydes, which as a result of their low solubility in dilute sodium hydroxide solution are very suitable for isolating the dialdehydes, can also be employed directly.

The preparation of heteryl-malonodialdehydes of this type is described, for example, in British patent specification No. 1,342,573, Example 3. It consists of the application of the known Vilsmeier aldehyde synthesis to nitrogen-heterocyclic compounds containing an activated methyl group.

The condensation reaction is carried out by heating the reactants with an agent which splits off water and thereby forms an acid, such as acid halides and anhydrides, preferably with phosphorus oxychloride. Phosphorus pentoxide, phosphorus pentachloride, zinc chloride, tin-4 chloride or aluminum chloride can also be added during this process in order to assist the condensing action. The condensation can also be carried out in an inert solvent or diluent, for example a chlorinated hydrocarbon, and at temperatures between 40° and 130° C., preferably between 60° and 100° C.

It is also possible to use excess phosphorus oxychloride as the diluent. The temperature is then between 50° C. and the boiling point of the mixture.

The quaternisation is carried out in a manner which is in itself known, for example by treating the salts 1a, in an aqueous medium, with acid-binding agents, such as lime, magnesium oxide, sodium carbonate or sodium hydroxide solution, and strong alkylating agents, such as dimethyl sulphate, diethyl sulphate or toluenesulphonic acid methyl, ethyl, β-chloroethyl or β-hydroxyethyl ester, or with, for example, ethylene oxide or propylene oxide, no additional acid-binding agent being necessary, or by treating the solution of the bases of the formula

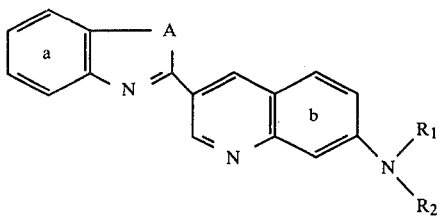

(VI)

liberated from the salts 1a in the customary manner, with, for example, the alkylating agents already mentioned or with reactive halogen compounds, such as methyl bromide, HOCH$_2$CH$_2$Cl, chloroacetic acid alkyl esters or β-dialkylamino-ethyl chlorides, in suitable solvents, such as toluene, chlorobenzene, dichlorobenzene, chloroform, dichloroethane, acetone, isopropanol, dioxane or dimethylformamide. The quaternisation can also be effected by adding on reactive vinyl compounds, such as acrylonitrile or acrylamide, using an acid medium, for example in glacial acetic acid or formic acid.

The new dyestuffs are distinguished by high brilliance, high tinctorial strength, very good affinity and good fastness properties.

They are suitable for dyeing and printing polyacrylonitrile and other acid-modified fibres, such as acid-modified polyesters, and also acetate rayon, coir fibres, sisal and jute, but also, in particular, for dyeing paper. Dyestuffs of the formula III, in particular, have an unexpectedly high affinity to cellulose, coupled with outstanding solubility in water or dilute acetic acid. These dyestuffs are considerably better absorbed by paper than dyestuffs known hitherto, so that the pollution of the effluent by non-utilised dyestuff is substantially decreased.

EXAMPLE 1

205 parts of benzthiazolyl-2-malonodialdehyde (prepared according to the instructions in Example 3 of British patent specification No. 1,342,573) and 136 parts of 3-amino-dimethylaniline are dissolved in 1,000 parts by volume of chloroform. 200 parts of phosphorus oxychloride are allowed to run in, whilst cooling. As soon as the exothermic reaction has ended, the mixture is heated to the boil and is kept at the reflux temperature for 1 to 2 hours, the chloroform is then distilled off and excess phosphorus oxychloride is decomposed by stirring the mixture with 3,000 parts by volume of water. After the hydrolysis has ended, the mixture is heated until it starts to boil; the dyestuff formed of the formula

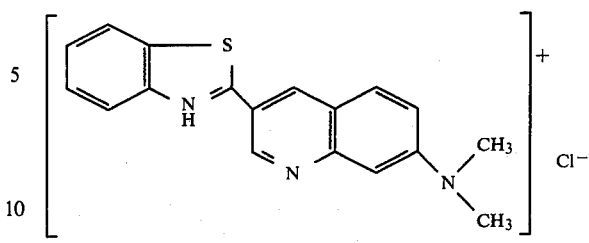

thereby dissolves and reprecipitates in the pure form on cooling the filtered solution. The yield is about 90% of theory.

Stirring this hydrochloride with dilute sodium carbonate solution (pH=10) gives the colour base of the formula

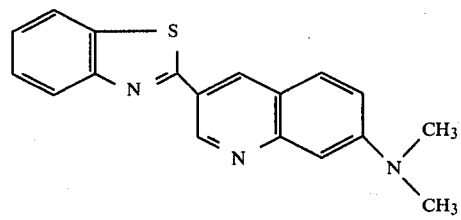

which, after recrystallisation from toluene, melts at 219°–223° C. 84.8 parts of this colour base are heated to the boil in 4,000 parts by volume of toluene with 40.0 parts of anhydrous dimethyl sulphate for 1 hour. After cooling, the quaternary salt of the formula

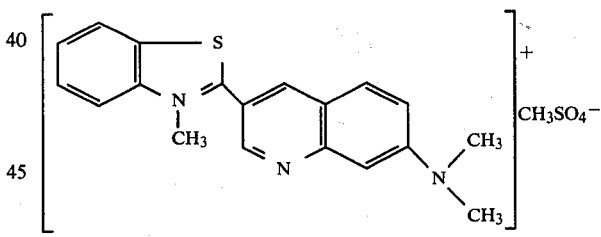

is filtered off and washed with toluene. The yield is almost quantitative. The dyestuff is outstandingly soluble in water and dilute acetic acid and gives very clear, intense reddish-tinged yellow dyeings on sized and unsized paper. As a result of the better utilisation of the available dyestuff, the staining of the effluent is considerably less than in the case of commercially available dyestuffs for paper.

If instead of the 3-amino-dimethylaniline, the equivalent amount of 3-amino-diethylaniline is used, an otherwise unaltered procedure gives the corresponding dyestuffs (that is to say the hydrochloride, the colour base and the quaternary salt with dimethyl sulphate), which are even more reddish-tinged yellow.

EXAMPLE 2

117.7 parts of the Na salt of the formula

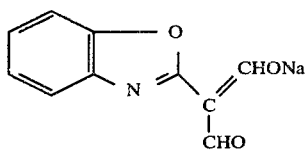

(prepared, analogously to the benzthiazole derivative used in Example 1, by reacting 2-methylbenzoxazole, and adding concentrated sodium hydroxide solution to the hydrolysed Vilsmeier mixture until the pH reached 10) and 76 parts of 3-aminodimethylaniline are heated to the boil with about 750 parts by volume of chloroform and 300 parts of phosphorus oxychloride for 1½ hours. The mixture is worked up according to Example 1; the base of the formula

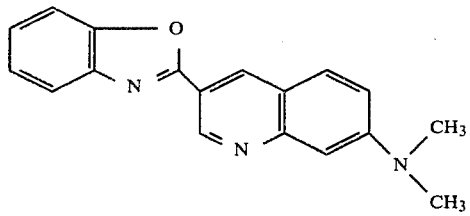

liberated from the hydrochloride primarily obtained melts, after recrystallisation from dimethylformamide, at 227°–229° C. The hydrochloride and the quaternary salt with dimethyl sulphate gives very brilliant, yellow dyeings and prints on polyacrylonitrile. It is suitable for dyeing paper, coir, sisal and jute and for use in offset printing.

Instead of the sodium salt used of the enol form of the benzoxazolyl-2-malonodialdehyde, it is also possible to employ the equivalent amount of the enamine of the formula

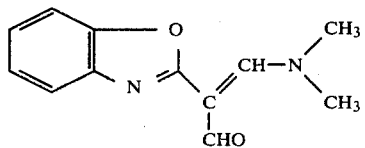

This enamine is obtained by controlled hydrolysis of the abovementioned Vilsmeier mixture at a maximum temperature of 55° C. and extraction of the mixture, neutralised with sodium hydroxide solution, with chloroform. After recrystallisation from a mixture of methylcyclohexane and toluene, the enamine melts at 115°–118° C.

EXAMPLE 3

21.5 parts of the dialdehyde of the formula

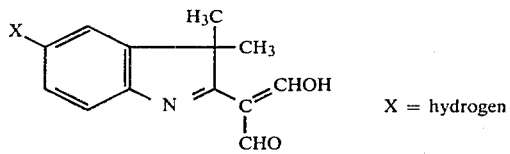

X = hydrogen and 13.6 parts of 3-aminodimethylaniline are introduced into 300 parts of phosphorus oxychloride. The mixture is warmed to 70°–75° C. for about 1 hour. Thereafter, most of the excess phosphorus oxychloride is distilled off under reduced pressure and 500 parts by volume of water are added to the residue. After the exothermic reaction has ended, the pH of the mixture is adjusted to 10 with sodium hydroxide solution and the mixture is filtered. The residue is recrystallised from methanol, an amount of potassium hydroxide sufficient to neutralise acid still included in the residue being added. The colour base of the formula

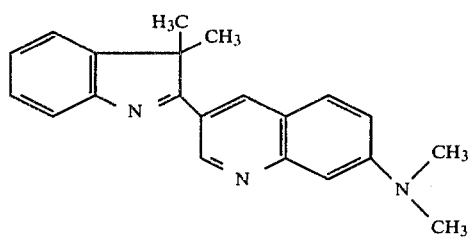

thus obtained melts at 164°–169° C.

Quaternisation is carried out according to the instructions in Example 1 and gives the dyestuff of the formula

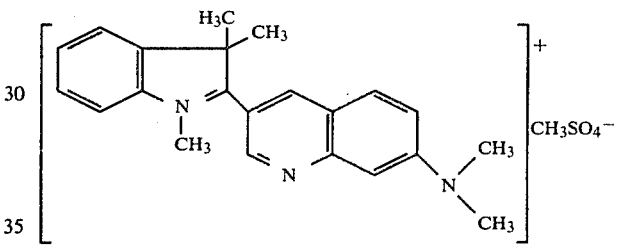

which gives brilliant yellow dyeings and prints on polyacrylonitrile or paper.

If instead of the dialdehyde employed (X=H), the dialdehydes accessible in an analogous manner, that is to say according to the instructions in Example 3 of British patent specification No. 1,342,573, in which X=CH₃, OCH₃, CH₂C₆H₅, OCH₂C₆H₅, Cl and COOCH₃, very clear, coloristically similar dyestuffs are also obtained.

EXAMPLE 4

51 parts of the compound of the formula

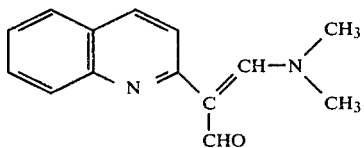

and 36 parts of 3-amino-dimethylaniline are dissolved in 250 parts by volume of chlorobenzene. After adding 100 parts of phosphorus oxychloride, the mixture is heated to about 95° C. for 2 hours and is allowed to cool, excess phosphorus oxychloride is decomposed by adding water, and the chlorobenzene is then distilled off with steam. The residue is filtered off and boiled up with 2,000 parts by volume of water. The dyestuff of the formula

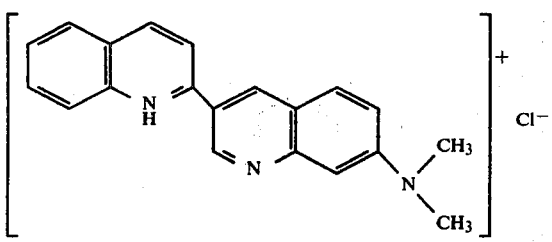

is separated out from the orange-coloured filtrate by adding sodium chloride. The base of the formula

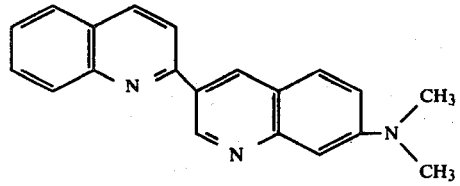

liberated from this dyestuff with sodium carbonate solution melts, after recrystallisation from an alcohol, at 217°–222° C.

Quaternisation of this base with dimethyl sulphate in toluene or chlorobenzene at about 100° C. gives the dyestuff of the formula

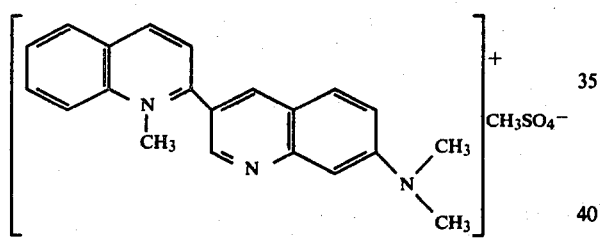

which gives very clear, golden yellow dyeings and prints on polyacrylonitrile and acid-modified polyesters.

EXAMPLE 5

1,000 parts of paper pulp (consisting of mechanical wood pulp and unbleached sulphite cellulose) are suspended in 18,000 parts by volume of water. 10 parts of $Al_2(SO_4)_3 \cdot 18\ H_2O$ (commercially available aluminum sulphate) and 2 parts of the dyestuff of the formula

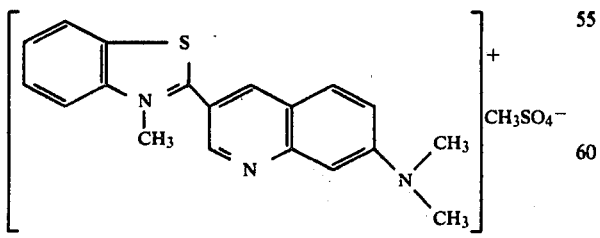

are added and the mixture is stirred at room temperature for about ½ an hour. Sheets of paper which are coloured in a very clear, intense reddish-tinged yellow shade are then prepared in the customary manner, for example on a wire. The effluent contains less than 10% of the dyestuff employed.

I claim:

1. Cationic dyestuff of the formula

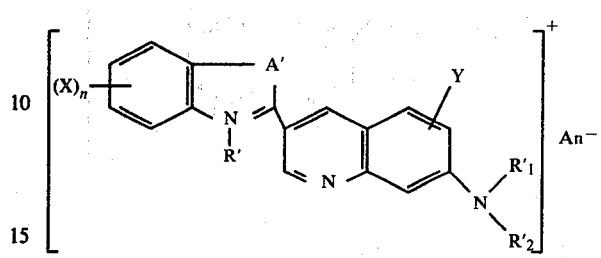

wherein

A' represents oxygen, sulphur or the groupings $>N-R'_3$,

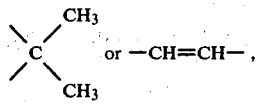 or —CH=CH—, wherein

R'$_3$ denotes a $C_1$–$C_4$-alkyl radical, which can be substituted by halogen, hydroxyl, $C_1$–$C_4$-alkoxy, phenyloxy, benzyloxy, $C_1$–$C_4$-alkoxycarbonyl, carboxyl, amidocarbonyl or cyano, or a phenyl, benzyl or β-phenyl-$C_1$–$C_4$-alkyl radical, which can be substituted in the phenyl radical by halogen, $C_1$–$C_4$-alkyl, $C_1$–$C_4$-alkoxycarbonyl, carboxyl, amidocarbonyl, cyano, amidosulphonyl, $C_1$–$C_3$-alkylcarbonylamino or benzoylamino, R' represents hydrogen or a $C_1$–$C_6$-alkyl radical, which can be substituted by halogen, hydroxyl, $C_1$–$C_4$-alkoxy, phenyloxy, benzyloxy, $C_1$–$C_4$-alkoxycarbonyl, carboxyl, amidocarbonyl or cyano, R'$_1$ and R'$_2$ independently of one another represent hydrogen or a $C_1$–$C_6$-alkyl radical, which can be substituted by one or two substituents from the group consisting of halogen, hydroxyl, $C_1$–$C_6$-alkoxy, phenyloxy, benzyloxy, $C_1$–$C_4$-alkoxycarbonyl, carboxyl, amidocarbonyl or cyano, or a phenyl, benzyl or β-phenyl-$C_1$–$C_4$-alkyl radical, which can be substituted in the phenyl radical by one to three substituents from the group consisting of halogen, $C_1$–$C_4$-alkyl, $C_1$–$C_4$-alkoxy, $C_1$–$C_4$-alkoxycarbonyl, carboxyl, amidocarbonyl, cyano, amidosulphonyl, $C_1$–$C_3$-alkylcarbonylamino or benzoylamino, X represents halogen, $C_1$–$C_4$-alkyl, $C_1$–$C_4$-alkoxy, phenyloxy, benzyloxy, $C_1$–$C_4$-alkoxycarbonyl, carboxyl, amidocarbonyl, cyano, amidosulphonyl, $C_1$–$C_3$-alkylcarbonylamino or benzoylamino, Y represents hydrogen, halogen, $C_1$–$C_4$-alkyl or $C_1$–$C_4$-alkoxy, n represents 0, 1 or 2 and An$^-$ represents an anion.

2. Cationic dyestuff of the formula

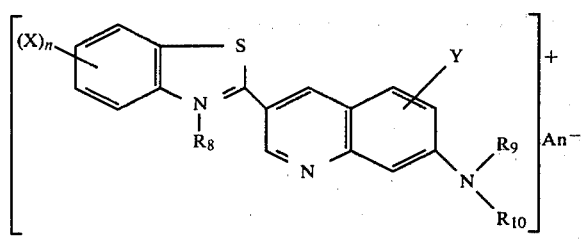

wherein

R$_8$ represents a methyl, β-hydroxyethyl, β-amidocarbonylethyl, β-cyanoethyl, β-chloroethyl or β-C$_1$-C$_4$-alkoxyethyl group, R$_9$ and R$_{10}$ represent a methyl, ethyl, benzyl or β-phenylethyl group and X, Y, An$^-$ and n have the meaning in claim 1.

3. Cationic dyestuff according to claim 2, wherein

R$_8$, R$_9$ R$_{10}$ represent methyl or ethyl, n represents O and

Y represents hydrogen.

4. Cationic dyestuff according to claim 1 of the formula

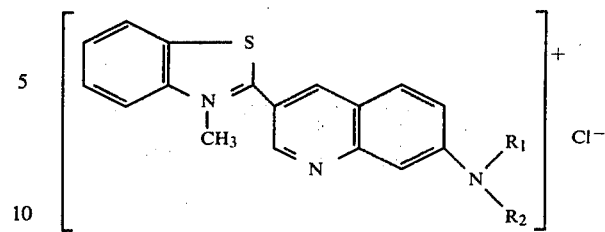

wherein R$_1$ and R$_2$ are methyl or ethyl.

5. Cationic dyestuff according to claim 1 of the formula

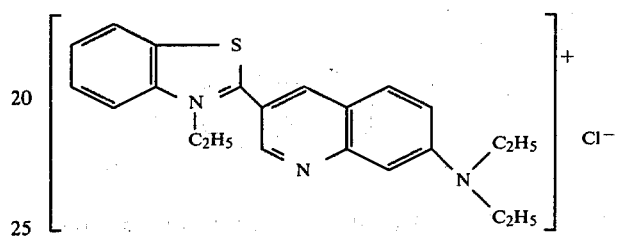

6. Cationic dyestuff according to claim 1 of the formula

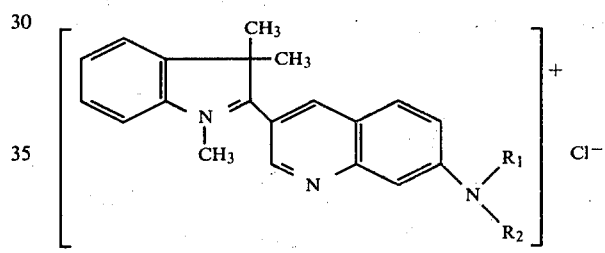

wherein R$_1$ and R$_2$ are methyl or ethyl.

* * * * *